United States Patent [19]

Griffin

[11] Patent Number: 4,678,143

[45] Date of Patent: Jul. 7, 1987

[54] LAUNCHER FOR REMOTELY PILOTED AIRCRAFT

[75] Inventor: Dennis Griffin, Guildford, England

[73] Assignee: Frazer-Nash Ltd., England

[21] Appl. No.: 749,822

[22] Filed: Jun. 28, 1985

Related U.S. Application Data

[63] Continuation of Ser. No. 539,983, Oct. 7, 1983, abandoned.

[30] Foreign Application Priority Data

Dec. 17, 1982 [GB] United Kingdom ................. 8235670

[51] Int. Cl.⁴ .............................................. B64F 1/06
[52] U.S. Cl. .................................................... 244/63
[58] Field of Search ................. 244/63, 31; 124/41 C, 124/41 R; 74/2, 531

[56] References Cited

U.S. PATENT DOCUMENTS

| | | | |
|---|---|---|---|
| 1,887,528 | 11/1932 | Stein | 244/63 |
| 1,960,264 | 5/1934 | Heinkel | 244/63 |
| 2,292,374 | 8/1942 | Hagenbuch | 244/63 |
| 2,379,267 | 6/1945 | Wilson | 244/63 |
| 2,413,723 | 1/1947 | Maxson et al. | 244/63 |
| 2,727,291 | 12/1955 | Hamblin | 244/63 |
| 2,923,872 | 3/1960 | Fulton et al. | 244/63 |
| 3,154,883 | 11/1964 | Gardella | 244/63 |
| 3,662,729 | 5/1972 | Henderson | 124/41 C |
| 3,837,235 | 9/1974 | Peterson | 74/531 |
| 4,079,901 | 3/1978 | Mayhew et al. | 244/63 |

FOREIGN PATENT DOCUMENTS 354445 of 1937 Italy ..................................... 244/63

OTHER PUBLICATIONS

Jane's All the World Aircraft, 1974–1975, p. 546.

Primary Examiner—Galen Barefoot
Attorney, Agent, or Firm—Hall, Myers & Rose

[57] ABSTRACT

A launcher is provided for a remotely piloted aircraft that has a launch ramp mounted on a transport vehicle and a carriage which is accelerated up the ramp carrying the aircraft to be launched. The carriage is hauled along the ramp by a cable leading to and wound around a winch drum which is driven by a flywheel through an electromagnetic slipping clutch, the flywheel being first run up to speed by an electric motor coupled to it by a torque limiting coupling. A hold-back device retains the carriage at the lower end of the ramp until the cable tension has built up to a predetermined value, and a brake system decelerates and arrests the carriage at the upper end as the aircraft leaves. On a short transport vehicle, the length of the ramp can be reduced for travel either by making it telescopic or by arranging it to fold about a hinge.

15 Claims, 8 Drawing Figures

LAUNCHER FOR REMOTELY PILOTED AIRCRAFT

This is a continuation of application Ser. No. 539,983, filed Oct. 7, 1983, now abandoned.

This invention relates to launching devices particularly suitable for launching remotely piloted (RPV) aircraft.

More particularly, it is an object of the invention to provide a means whereby RPV aircraft can be repeatably projected into the air from a ground station (normally on a motor vehicle) at a speed at which the flying control surfaces are fully effective, but without exerting excessive acceleration forces which could damage the aircraft. Mobility of the launch system is most important; and other important aims are to achieve, as far as possible, no smoke or heat emission from the power source, and no reliance upon external special services.

The present invention provides a launcher for launching a remotely piloted aircraft, comprising a transporter vehicle, a launch ramp mounted on said transporter vehicle and providing an inclined track, a carriage mounted on said launch ramp to travel along said inclined track, and actuating means for accelerating said carriage with an aircraft to be launched thereon up said inclined track, said actuating means including a flywheel, disengageable driving connections between said flywheel and said carriage, and motor drive means for accelerating said flywheel up to an operational speed of rotation with said driving connections disengaged. If the transporting vehicle is comparatively short in length, the launcher ramp may comprise a beam that is in two sections joined by a hinge connection at an intermediate position along the beam, whereby the beam can be folded about the hinge connection for transport.

Several arrangements embodying the invention will now be described, by way of example, with reference to the accompanying drawings, in which.

Figure 1:
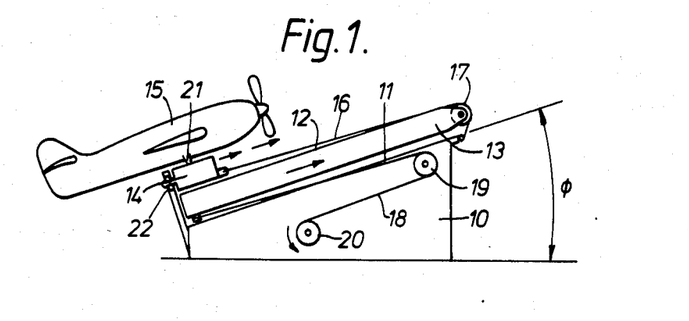
FIGS. 1 and 2 are diagrams of a launcher before and immediately after launch.
Figure 2:
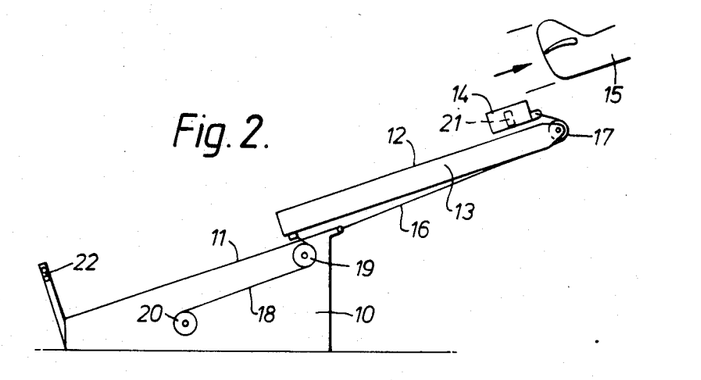

Referring firstly to FIGS. 1 and 2, the launcher has a ramp 10 inclined at the chosen launch angle $\phi$ and up which extends a fixed track 11. Slidably mounted on the track 11 is a rail 12 on an extendible boom 13 which can be driven from the retracted position shown in FIG. 1 to the extended position shown in FIG. 2 thereby extending the launch ramp to substantially twice its length on launch. A shuttle or carriage 14 mounted to run on the rail 12 carries the RPV aircraft 15.

Before the commencement of launch, the boom 13 with the rail 12 is retracted and the shuttle 14 with the aircraft 15 is at the lower end of the rail 12, as shown in FIG. 1. During launch, the boom extends and simultaneously the shuttle travels to the upper end of the rail 12, until the position in FIG. 2 is reached when the aircraft leaves the launcher. Due to the extension of the boom 13 while the shuttle 14 is travelling along the rail 12, the shuttle is moved at twice the speed of the rail over twice the distance. Suitable buffers are provided to absorb the kinetic energy of the rail and shuttle at the end of a launch, whilst an automatic latch device 21 releases the RPV from the shuttle.

The travel of the shuttle and the extension of the boom are achieved very simply. A rope or cable 16 attached to the shuttle 14 is led up the boom 13, around a pulley 17 at the upper end of the boom and then anchored to the upper end of the ramp 10. Therefore, when the boom extends the cable 16 pulls the shuttle along the boom. A second cable 18 attached to the lower end of the boom 13 is taken up the ramp 10, around a pulley 9 on the ramp and then to the cable drum 20 of a winch. Operation of the winch winds the cable 18 on to the drum 20 and pulls the boom 13 along the track 11. An automatic hold back latch 22 prevents launcher movement by anchoring the shuttle 14 at the lower end of the boom 13 until a predetermined thrust is achieved, whereupon it is suddenly released to start the launch.

Figure 3:
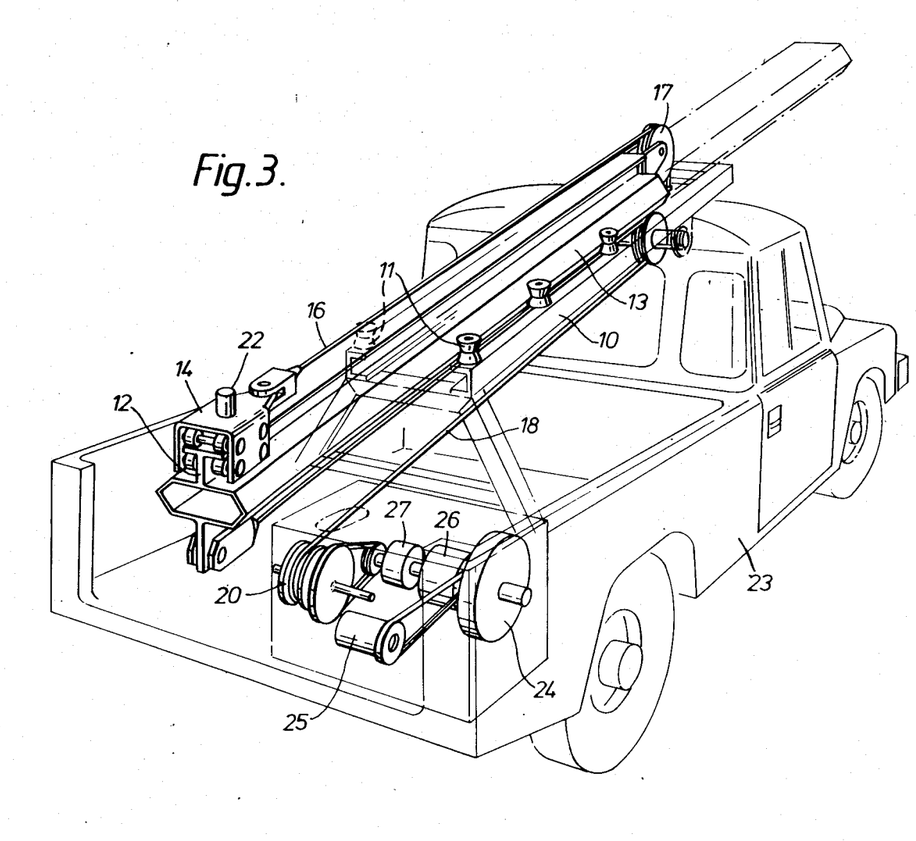
FIG. 3 is a pictorial view of a launcher mounted on a vehicle.

FIG. 3 shows the system mounted on a transporter vehicle 23 and also shows the winch drive. In order to achieve a constant high energy acceleration without smoke or heat emission, the principle of energy storage in a flywheel 24 is employed, the flywheel being first spun up by a small electric motor 25. On launch, the already spinning flywheel is coupled to the winch drum 20 by an electromagnetic clutch 26 the drive transmission including a constant torque coupling 27. This may be a pressure-controlled slipping clutch device or a magnetic powder coupling, with the torque transmitted being adjustable to suit RPV aircraft of different mass. In this way, a very constant force is applied to the boom 13 via the drum 20 and cable 18.

Figure 4:
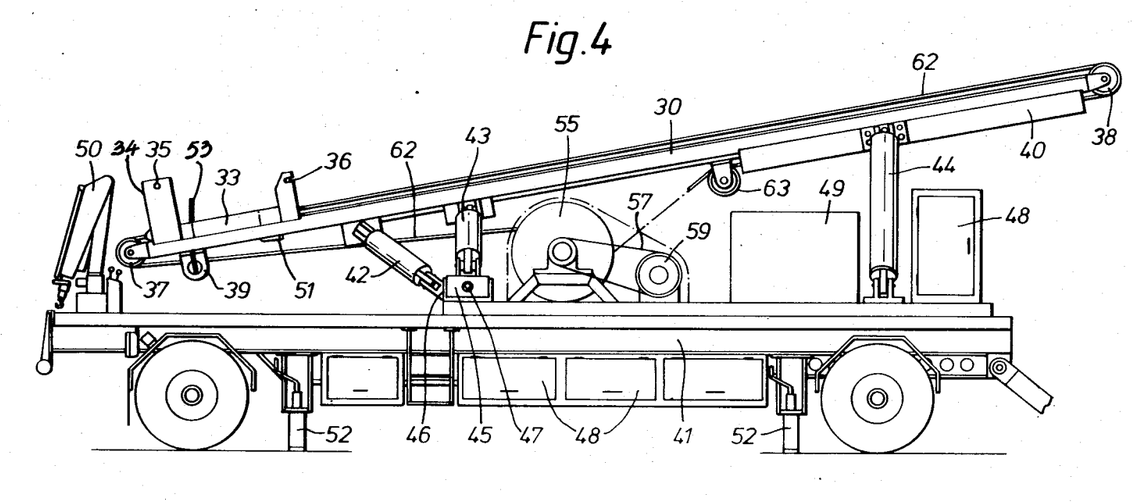
FIGS. 4, 5 and 6 are, respectively, a side elevation, plan and end elevation of another embodiment.
Figure 5:
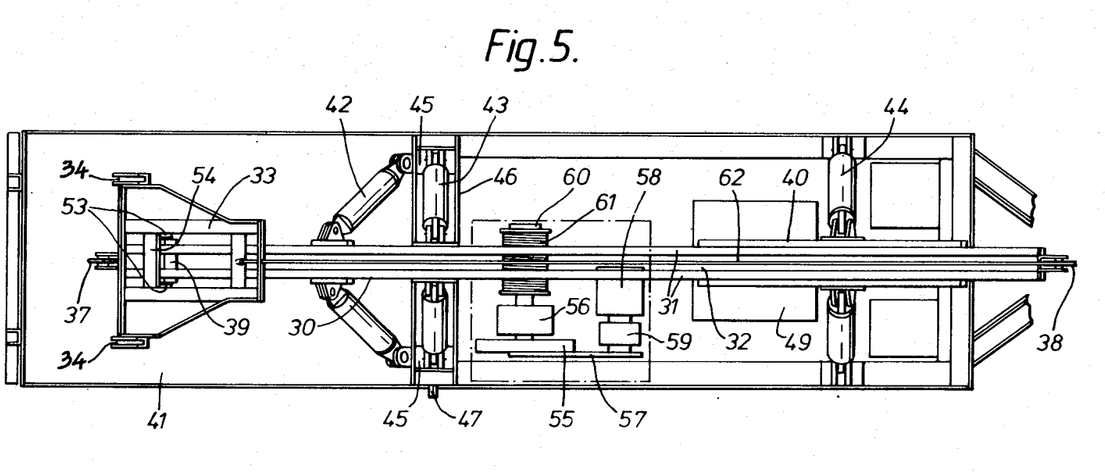
Figure 6:
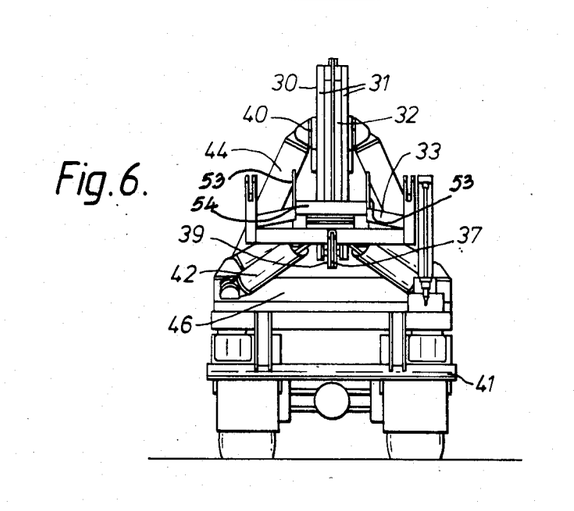

Referring now to FIGS. 4 to 6, this shows an arrangement in which the launcher ramp is mounted for transport on a longer vehicle than in FIG. 3 so that it does not need to be telescopic.

The launcher ramp 30 itself is constructed of a pair of parallel steel or aluminium 'I' or channel section beams 31 mounted side by side with a gap 32 between them to provide a pair of rails. Sliding along the upper surfaces of the rails 31 is the launcher carriage 33. This is of aluminium alloy and has slotted runner blocks with slots lined with a dry bearing material into which the flanges of the rails 31 engage.

The carriage 33 has four connection points for receiving the RPV; the two rearward points 34 provide positive location by means of shear pins 35, while the forward points are simple hooks 36. The shear pins 35 not only provide the launching thrust to the R.P.V., but also retain the air vehicle in position on the carriage 33 whilst static. However, as an alternative, the shear pins could be replaced by a hook arrangement similar to that of the forward connection points, the RPV then being held on the carriage by the holdback mechanism to be described later and the thrust being provided by the forward facing hooks.

Mounted between the rails 31 at each end of the ramp are two cable pulleys 37, 38 of approximately 300 mm diameter. Also mounted between the rails are a holdback mechanism 39 at the lower end of the ramp and a braking system 40 along the upper portion of the ramp.

The ramp assembly is supported on the vehicle 41 by means of three pairs of struts 42, 43, 44 made from hollow circular section steel for a favourable strength to weight ratio and secured to the vehicle frame and the ramp by pivotal anchorages. To provide for adjustment of the height of the rear or lower end of the ramp, whilst maintaining rigidity longitudinally, the lower end anchorages of one of the pairs of struts 43 carrying the lower portion of the ramp are located on a pair of blocks 45 that can slide toward and away from one another horizontally across the vehicle frame in a channel track 46, thereby to change the angular inclinations of the struts. The blocks 45 have threaded holes and constitute nuts on a lead screw 47 extending longitudinally of the channel track 46 and having two oppositely-threaded lengths for the two "nuts". Adjustment is by a simple manual crank, not shown, fitted on a squared end of the lead screw. The pivotal anchorages of the other pairs of struts 42, 44 are adapted to allow this height adjustment.

The vehicle 41 on which the ramp is mounted is a flat bed trailer which has two axles, the front being steerable. The trailer has ample storage space 48 for tools, spares and other equipment as well as a 10 kW generator 49 to provide the electrical power required. The trailer can also be fitted with an electrically-operated hydraulic hoist 50 which is completely self-contained. This serves for loading an RPV on to the ramp for launch. The vehicle also has retractable feet 52 so that it can become an entirely stable and static launch platform.

At the end of the launch stroke the carriage 33 is brought to rest by the launcher braking system 40. This is a sub-assembly mounted on the parallel rails 31 at the forward portion of the ramp. The brakes consist of a pair of opposed strips substantially parallel to the rails and faced on their inner surfaces with a metallic frictional brakelining material and which are spring-mounted on to backing plates. The strips are arranged in a narrowing "vee", that is to say they converge gradually and progressively in the direction of launch, with the springs behind them increasing in stiffness in the same direction. The springs have adjustable stops which allow the braking rate to be pre-set to suit the carriage mass.

Manufactured as part of the carriage and projecting beneath it, is a solid blade 51 which enters between the brake strips as the carriage approaches the end of its travel. It is this blade, which is increasingly gripped by the braking strips, which provides the braking force on the carriage. In normal use, only half of the total travel along the brake assembly will be used.

The holdback mechanism 39 is required to ensure that the correct acceleration characteristic is produced and hence a successful launch achieved. Ideally, the holdback would only need to restrain the RPV from moving under its own engine power but, having regard to the nature of the carriage drive, it will have the additional effect of ensuring that maximum use is made of the launch stroke by reaching the normal acceleration level as quickly as possible, consistent with acceptable vehicle "jerk" levels. The aim is to accelerate the RPV at the maximum acceleration it will safely stand.

The holdback mechanism consists of a pair of levers 53 mounted on a common shaft which is in turn mounted between the rails 31 at the rear end. Arranged around the lever pivot points are circular friction pads which are spring-loaded and adjustable. The pressure on these pads determines the force required to rotate the levers and hence move the carriage 33 bearing the RPV. The levers 53 bear against the front of and obstruct the rear carriage cross-beam 54 until they have been sufficiently rotated to clear it, at which moment the carriage is free to accelerate. The levers 53 provide a frictional holdback mechanism that engages the carriage and restrains it over a predetermined range of movement by a frictional holdback force at the commencement of the launch and over the entire range of restraints as a decreasing function of distance travelled by the carriage.

To return the holdback mechanism to its initial position, an overcentre cam arrangement is employed to release the spring pressure on the friction pads and allow the levers 53 to be manually reset.

Figure 8:
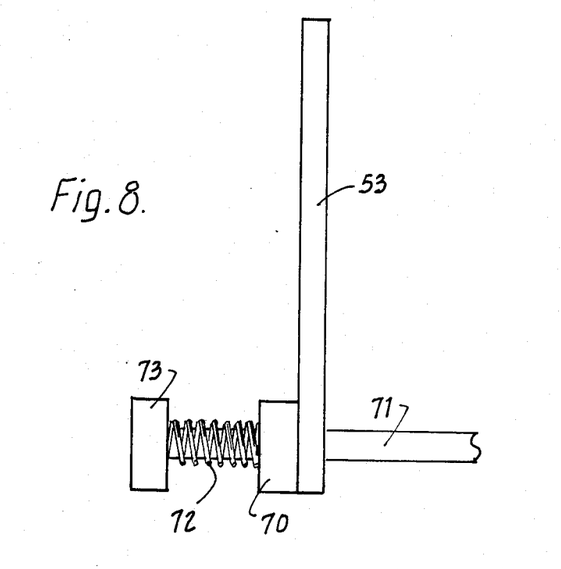
FIG. 8 is a simplified diagram illustrating the interaction between the friction pad and lever arm of the present invention.

As illustrated in FIG. 8, a friction pad 70 is disposed about pivot shaft 71 of the members 53. The friction pad 70 is biased into contact with the pivoted end of the lever 53 by a spring 72. The compression force of the spring 72 is adjusted in a known manner by a member 73. One of these arrangements is associated with each of the levers 53 so that a very strong restraining force may be developed as desired.

The energy for the carriage drive is provided by a flywheel 55 via a constant torque clutch 56. The flywheel is initially run up to speed by a belt drive 57 from an electric motor 58 powered by the onboard generator 49. In order to moderate loads on the motor 58 and its power supply, the motor drive includes a torque-limiter 59. The clutch 56 couples the flywheel 55 to the shaft of a winch 60 having a rotating cable drum 61, and two lengths of steel cable 62 are led from around the drum to opposite ends of the carriage 33, the cable lengths passing around the pulleys 37, 38 and one being guided by a further pulley 63. As already indicated, the launch carriage 33 is restrained by the holdback mechanism 39 until a predetermined amount of cable tension is achieved, to ensure that the correct rate of change of RPV launch acceleration, or jerk, is applied.

To satisfy the energy requirements, a flywheel 55 can be provided that is manufactured of steel with a diameter of 1 meter and a rim width of 43 mm. In order to accelerate this flywheel to its running speed of 3000 rpm within 10 minutes, the electric motor 58 will have an average torque of 15.7 Nm. The coupling 59 is preferably a powder coupling, which is simpler and less expensive than the equivalent electronic control. By varying the amount of powder contained in the coupling, the speed at which the coupling becomes "locked" is changed accordingly.

The clutch 56 between the flywheel and the winch is preferably an electro-magnetic plate clutch taking its electrical supply from the onboard generator. The engagement characteristics of such clutches are known and it is intended that the clutch will be slipping throughout the launch stroke. A suitable clutch for this purpose will be approximately 0.55 meters diameter and will have a mass of 260 kg, with an expected service life of approximately 10,000 launches.

The cable drum 61 is an aluminium alloy drum that is grooved to accept the cable and of hollow construction to reduce inertia. If desired, the profile of the drum can be designed to modify the clutch torque to achieve a substantially constant cable tension. The cable 62 is a 14 mm diameter steel cable, or alternatively a Kevlar cable can be employed, and the cable system is a closed loop to enable the carriage to be returned under power from the cable drum.

The launcher control arrangements consists of a launch speed control system, a control panel on the launch vehicle itself, and a remote controller, duplicating the control panel on the vehicle and connected to it by a flexible remote control cable.

The control panels will feature the following functions:

(a) safety interlock indicator
(b) flywheel start button
(c) flywheel RPM readout
(d) ready-to-launch indicator
(e) launch button
(f) launch velocity readout The launch speed control system includes a tachometer generator on the cable drum which feeds to a comparator a voltage the magnitude of which is determined by the drum speed. The comparator compares this signal with a preset voltage signal representing the drum speed corresponding to the minimum RPV launch velocity, and when the signals are equal the electromagnetic clutch 56 can be switched off.

However, an override is incorporated to ensure that the clutch is not switched off until the carriage is nearly at the end of the launch stroke (e.g. has covered 95% of its travel).

To ensure that a launch is only possible under control and when all systems are functioning correctly, a number of interlocks are provided. Firstly, a safety pin must be withdrawn from the ramp and inserted into a socket in the manual controller before the electrical control circuitry is completed and functional. In its stored position in the ramp, this pin prevents the holdback levers from rotating and locks the carriage. Secondly, a switch senses the position of the brake strips to ensure that they are closed again if opened to release the carriage after a previous launch. Further sensors monitor the correct position of the carriage and holdback mechanism and detect flywheel speed and clutch disengagement.

In operation, the RPV is loaded on to the launcher carriage 33 by means of the hoist 50 on the trailer. During this operation, the flywheel 55 is spun up to speed by the drive motor 58. The launcher safety pin is removed from its stored position restraining the holdback levers and the ramp is elevated to its correct launch attitude. The safety pin is then inserted into a socket in the remote hand-controller which makes the circuit "live". If all systems are correct, the "OK to fire" lamp will illuminate and the "fire" button may be depressed.

The clutch 56 engages and the drum 61 rotates, winding in the cable and accelerating the RPV on its carriage along the ramp. The carriage is then braked and the RPV is launched.

The carriage may then be returned to the start position, the safety pin inserted, and the drive motor 58 restarted to bring the flywheel up to speed again, if required.

Figure 7:
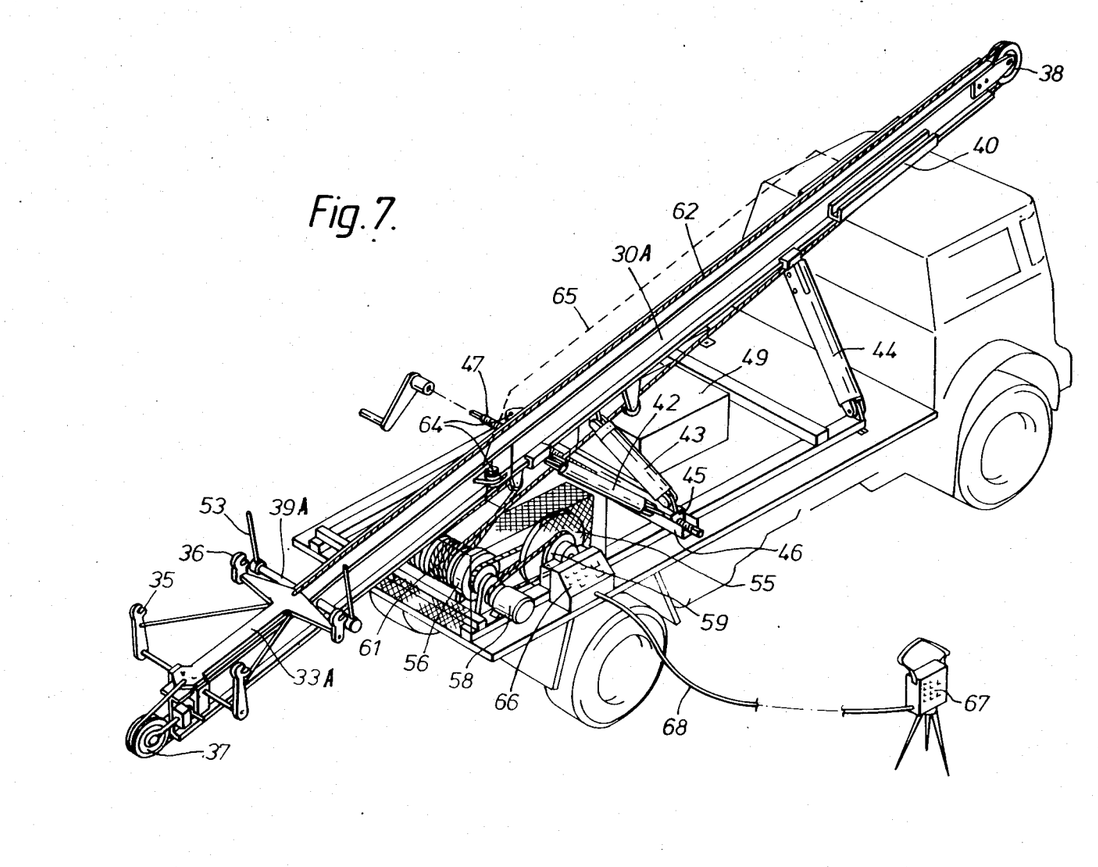
FIG. 7 is a pictorial view, similar to FIG. 3, of a further embodiment.

In the embodiment of FIGS. 4 to 6, the support vehicle 41 is long enough to carry a full length ramp without the need for the telescopic arrangement of FIG. 3. However, FIG. 7 shows an alternative to the embodiment of FIG. 3 when the support vehicle is not long enough to travel with the ramp at full length. The embodiment of FIG. 7 is similar in many respects to that of FIGS. 4 to 6 and parts having the same function are given like reference numerals. In this embodiment, the ramp 30A is a single I beam in two sections with an oblique hinge system at 64 permitting the rear section to be folded round laterally beside the front section for transport, into the position shown in broken lines at 65.1 FIG. 7 also shows the controller 66 on the vehicle and the remote controller 67 connected to it by the remote control cable 68. Instead of the clutch 56 being a single clutch, it may advantageously be a duplex clutch system comprising two clutches. It should be noted that in this embodiment the carriage 33A is in the approximate form of a crossbow rather than parallel arms with cross members.

Since RPV aircraft tend to be relatively lightweight devices (up to 250 kg) and can be launched at, say, 40 m/sec, a modest-sized flywheel spun up to say 3000 r.p.m. by a small electric motor, or alternatively by direct power take-off from the engine of the transporter vehicle, is quite adequate to achieve launch velocity in the length of travel afforded by the launch ramps in the embodiments described. The system is compact and inexpensive, easy to operate and maintain, can readily be adjusted to suit different RPV aircraft, and clean and emission-free in operation.

What is claimed is:

1. A launcher for launching a remotely piloted aircraft, comprising a transporter vehicle; a launch ramp mounted on said transporter vehicle and providing an inclined track; a carriage mounted on said launch ramp to travel along said inclined track; actuating means for accelerating said carriage with an aircraft to be launched thereon up said inclined track, said actuating means including a flywheel disengageable driving connection between said flywheel and said carriage, and motor drive means for accelerating said flywheel up to an operational speed of rotation with said driving connections disengaged; a frictional holdback mechanism at the lower end of the launch ramp track to engage the carriage and restrain it over a predetermined range of movement by a frictional holdback force at the commencement of launch and over the entire range of restraint as a decreasing function of distance traveled by said carriage whereby a predetermined force is developed to impel the carriage along the track; and frictional holdback force adjusting means to adjust the frictional force exerted by said holdback mechanism.

2. A launcher according to claim 1, wherein the launch ramp has a sliding boom that is telescopically extendible at the upper end of the ramp, the carriage is mounted to travel along said boom, and the actuating means are arranged both to cause the boom to extend and also to accelerate the carriage along the boom during launch.

3. A launcher according to claim 1, wherein the launch ramp comprises a beam that is in two sections joined by a hinge connection at an intermediate position along the beam, whereby the beam can be folded about the hinge connection for transport.

4. A launcher according to claim 1, wherein a carriage braking means is provided at the upper part of the launch ramp track to decelerate and arrest the carriage before it reaches the upper end of the track.

5. A launcher according to claim 4, wherein the braking means comprise two opposed brake strips extending along the track to form a slot between them, said brake strips being spring-loaded toward one another and converging in the direction of launch, and a blade is provided on the carriage arranged to enter the slot to be gripped by said brake strips.

6. A launcher according to claim 1, wherein means are provided to locate and retain an aircraft to be launched on the carriage during launch said means including shear pins.

7. A launcher according to claim 1, wherein a support assembly is provided mounting the launch ramp on the vehicle which includes jacking means whereby the angle of inclination of the launch ramp can be changed.

8. A launcher according to claim 1, wherein said disengageable driving connections include a slipping clutch.

9. A launcher according to claim 8, wherein said slipping clutch couples the flywheel to a cable drum that tensions a cable connected to the carriage to haul it along the launch ramp track.

10. A launcher according to claim 9, wherein cable lengths extend from the carriage both forwardly and rearwardly and are wound in opposite directions around the cable drum whereby the carriage can be hauled under power along the launch ramp track by the cable drum in both directions.

11. A launcher according to claim 8 or claim 9 or claim 10, wherein the slipping clutch is an electromagnetic clutch.

12. A launcher according to claim 1, wherein the flywheel is spun up to operational speed by an electric motor receiving its electrical supply form a generator on the vehicle, a torque limiter being interposed in the drive between the motor and the flywheel.

13. A launcher according to claim 12, wherein the torque limiter is a powder coupling.

14. A launcher according to claim 1, wherein a portable controller and a flexible cable connecting it to the vehicle-borne launcher are provided for controlling a launch at a position remote from the vehicle.

15. A launcher according to claim 1, wherein the frictional hold-back mechanism comprises a pair of levers that are mounted to swing from a first position in which they obstruct the carriage to a second position in which they clear it, and adjustable frictional means acting on the levers whereby they cannot swing from said first to said second positions until acted upon by a predetermined thrust.

* * * * *